Patented May 3, 1927.

1,626,784

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

RUBBER-DETERIORATION RETARDER AND PROCESS OF MAKING.

No Drawing.  Application filed September 23, 1924. Serial No. 739,348.

This invention relates to a rubber deterioration retarder and the process of making same, more particularly to the deterioration retarder formed by the condensation of acetaldehyde and aromatic amines in acid solution, and the process of making same.

A serious difficulty in use of rubber articles is the more or less rapid deterioration of such articles depending on various conditions such as the stock employed, the form of the article, the conditions under which it is used and other variables. The principal causes of this deterioration are overvulcanization and deterioration caused by oxidation. In my co-pending applications Sr. Nos. 656,453, and 656,454, filed August 8, 1923 there is described a process for overcoming deterioration of rubber, balata and gutta percha caused by oxidation, and among the substances disclosed for overcoming such deterioration is the acetaldehyde-aniline condensation product prepared in acid solution. The present invention relates to this and similar deterioration preventing materials and the method of making the same.

An object of my invention is to provide a simple, rapid and easily carried out process for producing an aldehyde-amine acid condensate. Another object is to provide a process for substantially completely combining equi-molecular proportions of acetaldehyde and an aromatic amine in acid solution. Another object is to provide a process for making an acid condensate of the character described which will substantially eliminate waste products and which may be continuously carried out. Another object is to provide a retarder of deterioration in rubber which is stable, substantially does not accelerate vulcanization, is equally applicable for retarding deterioration in either unvulcanized or vulcanized rubber, balata, or gutta percha, which does not interfere with any accelerators used, and which may be incorporated with the rubber either in the form of latex, in its plastic form on the mill, or by treating the rubber with the retarding material in solution. Other objects will appear from the detailed disclosure in the specification.

The invention consists broadly in the preferred form in combining equi-molecular proportions of acetaldehyde and an aromatic amine in acid solution, precipitating the desired acetaldehyde-aromatic amine acid condensate by the addition of a base, and removing and washing the precipitate. It also comprises a continuous process by which the acid filtrate separated from the precipitate at the end of each operation is again reacted upon to produce successive precipitates of the desired material without substantial loss of by-products. The invention also comprises the products of the process.

This application is a continuation in part of application Serial No. 641,764, filed May 26, 1923.

The preferred method will first be described by which the substantially complete combination of equi-molecular amounts of acetaldehyde and an aromatic amine such as aniline can be secured, with a resulting condensation product which is a very efficient retarder of deterioration and substantially does not accelerate vulcanization. The products obtained by the use of other proportions are also retarders of deterioration.

To prepare such a product 93 grams of aniline may be dissolved in 500 ccs. of twice normal hydrochloric acid, the solution cooled and to the stirred aqueous solution of the aniline hydrochloride there is then added a 40-50% solution of 44 grams of acetaldehyde made up in ½ normal acid or water, the latter solution being added at such a speed that the temperature does not rise above 25° C. In order to prevent such rise in temperature it may be necessary to add some ice. After the acetaldehyde has all been added, the solution is stirred for 30 min. Between .8 and .9 of the acid is then neutralized with sodium hydroxide, resulting in the precipitation of the desired acetaldehyde-aniline acid condensate as a free base in a powdered form which can be easily filtered. It is desirable that the acid be not completely neutralized as otherwise any uncombined aniline which is present will be precipitated and will dissolve the acetaldehyde-aniline condensate to form a gum instead of a powder. The precipitate is then separated by filtration and dried.

The acid condensate thus obtained is in the form of a yellow amorphous powder having a melting point below 130° C. and above 50° C. It is completely soluble in aniline and mixtures of alcohol and benzol, but only partially soluble in alcohol, benzol, or ether alone. It should be completely soluble in a mixture of 4 parts of benzol and 1 part of alcohol, and should dissolve in 4 normal hydrochloric acid to yield a clear reddish solution. It dissolves in mineral acid to yield a dark reddish brown solution. It is quite stable under ordinary conditions and may be kept for extended periods of time without deterioration. On standing exposed to air for several days the outer surface undergoes a deepening in color, but this change apparently does not impair its qualities.

In order to render the process continuous and avoid by-products, the procedure in the above example may be slightly modified by adding a second equi-molecular proportion of analine, that is about 93 grams, to the reaction product of the acetaldehyde and aniline instead of sodium hydroxide. The aniline being a stronger base than the condensation product precipitates the latter, leaving in solution substantially 93 grams of aniline in the hydrochloric acid. After filtering off and washing the acetaldehyde-aniline condensate, the filtrate containing aniline hydrochloride and some condensate has added thereto a sufficient amount of wash water to again make 500 ccs. of solution as originally started with, and this solution again reacted upon with acetaldehyde. The acidity should be maintained between one-half and twice normal, and this may be accomplished by adding 8 to 10 ccs. of 13 normal hydrochloric acid to each succeeding preparation.

By the processes above outlined an almost complete combination of equi-molecular proportions of acetaldehyde and aniline is obtained, the yield being about 95%. While in the examples given hydrochloric acid has been employed as the preferred substance it is possible to also use another strong acid such as sulphuric acid. However, hydrochloric acid is stronger and accelerates the condensation more than sulphuric acid. Another objection to the use of sulphuric acid is that aniline hydrochloride is very soluble while aniline sulphate is quite insoluble, and the amount of sulphuric acid required is about 5 times by volume the quantity needed when hydrochloric acid is used, and the maximum yield with sulphuric acid has been about 70%.

As another example of the process for obtaining the acetaldehyde-aniline acid condensate, the follwing is given, which is the process set forth in my co-pending application No. 656,453, before mentioned. A molecular weight of aniline dissolved in a molecular weight of approximately normal hydrochloric acid is treated with 1½ molecular weights of acetaldehyde in approximately 50% aqueous solution. It will be observed that the hydrogen ion concentration of the reaction mixture is greater than $1 \times 10^{-3}$. A reaction occurs as indicated by the heat evolved. About 30 min. after the two solutions have been mixed about nine-tenths of the acid is neutralized with normal sodium hydroxide which is added slowly with continuous stirring. This operation precipitates a light colored solid which is separated by filtration and washed substantially free of chlorides with water. After drying the material is ready for use.

The material is a light colored solid which softens at 85° C., or below, and is completely melted below 150° C. On melting it is converted into a reddish liquid. Its color changes slightly on exposure to air. It is insoluble in water, soluble in hydrochloric acid, only slightly soluble in ligroin and completely soluble in a mixture of benzol and ethyl alcohol. This material retards deterioration of rubber but does not appreciably accelerate the vulcanization of rubber.

The material is believed to consist of several acetaldehyde-aniline condensates including the two isomers of di-molecular ethylideneaniline melting at 85° C. and 126° C. (Ber. d. deut. Chem. Ges. 25, 2020; 27, 1296). These isomers have been isolated and found to retard the deterioration of rubber and not to accelerate the vulcanization of rubber.

The condensation of acetaldehyde and aniline has also been carried out under varying conditions as follows:

One mole of acetaldehyde and two moles of aniline were condensed in the presence of a small amount of alkali or in a chilled aqueous solution and yielded a white crystalline solid having a melting point of 51° C. This product was unstable at ordinary temperatures and decomposed somewhat while being milled into rubber. It retarded deterioration but also accelerated vulcanization.

Two moles of acetaldehyde and one mole of aniline were condensed in a concentrated acid solution and the reaction mixture allowed to stand for a long time. The solution was then made alkaline and an ocher yellow amorphous compound was precipitated, which had a melting point of 170–180° C. This is the so-called Schultz base (Ber. d. deut. Chem. Ges. 25, 2072) and possesses neither retarding nor accelerating qualities. If the condensation is carried out in a weakly acid or basic solution the product formed is that disclosed in may Patent No. 1,417,970, May 30, 1922, which is an excellent accelerator of vulcanization and also a retarder of deterioration.

By the direct addition of one mole of acetaldehyde to one mole of chilled aniline, water and a yellow oil were formed. The oil became red on standing and is an eccelerator as well as a retarder of deterioration. If the condensation is carried out in alcoholic solution at a temperature of 0° C. di-molecular ethylidene aniline is formed as a white crystalline solid having a melting point of 126° C. This compound is an excellent retarder of deterioration and is not an accelerator of vulcanization.

As showing that the acetaldehyde-aniline acid condensation product is not an accelerator of vulcanization, the following test was made: 100 parts of pale crepe, 10 parts zinc oxide, 3 parts sulphur, and 1 part acid condensate were compounded in the usual manner and heated in a mold for 60 minutes under 40 lbs. steam pressure. The resulting product showed very poor vulcanization and had a tensile strength of less than 1800 lbs. per sq. in. The acid condensate is also valuable by reason of its adaptability under various conditions, since it may be used either with vulcanized or unvulcanized rubber, balata, or gutta percha, and if used in the unvulcanized material the property of retarding deterioration persists after vulcanization. It may be milled into rubber, mixed directly with latex, or applied to the material in the form of a solution. In general from 3–5% of the condensate with 100 parts of rubber retards the oxidation aging of any stock from 100–400%. This retarding of oxidation occurred in tests made in a box at ordinary temperatures, at 158° F., at 212° F., and 286° F., and also took place when directly exposed to the sun and weather. This material also retards oxidation during vulcanization in air.

A pure gum stock was make up of 100 parts of spray dried rubber with 10 parts of sulphur, and a similar stock with 5 parts of acid condensate. Another stock was made up of 100 parts of pale crepe and 10 parts of sulphur, and a similar one with 5 parts of acid condensate. On aging at 158° F. after curing the blanks of the spray dried rubber and pale crepe containing no deterioration retarder had almost completely deteriorated at the end of ten days, while the same stocks containing the acid condensate had deteriorated merely from about 4000 lbs. to somewhat below 3600 lbs. tensile strength, and the acid condensate stocks lasted about 2½ times as long before completely deteriorating.

Hot water bottles made up of various stocks both with and without oxidation retarder were tested under the continued action of boiling water, and in each case the bottles made from stock containing the oxidation retarder lasted from 2 to 2½ times as long as those of regular stock before breaking.

Tests made of other stocks with and without the use of the acid condensate showed great improvement in the acid condensate stocks in tensile strength and permanent set over the previously used stocks. In particular in the case of thread stock aged under constant stretch it was shown that when aged in air the acid condensate stock had a very much less permanent set than the blank, while when aged in nitrogen the blank and acid condensate stocks had practically the same set, this test proving very conclusively that the acid condensate actually retards oxidation.

While the above disclosed examples illustrate the process as applied to the condensation of acetaldehyde and aniline in acid solution, I have employed in place of aniline with similar excellent results ortho-toluidine, para-toluidine, meta-toluidine, mono-methyl-aniline, and meta-4-xylidine.

It will be seen from the above disclosure that the objects of the invention previously set forth have been attained, and while specific examples have been given, the invention is capable of modification and it is not desired to limit it otherwise than as set forth in the appended claims.

Having thus described my invention, what I claim and desire to protect by Letters Patent is:

1. The process of making a deterioration retarder for rubber, which comprises combining acetaldehyde and an aromatic amine in a hydrochhloric acid solution.

2. The process of making a deterioration retarder for rubber, which comprises combining acetaldehyde and aniline in an acid solution having a hydrogen ion concentration greater than $1 \times 10^{-3}$.

3. The process of making a deterioration retarder for rubber, which comprises combining equi-molecular portions of an aliphatic aldehyde and an aromatic amine in acid solution.

4. The process of making a deterioration retarder for rubber, which comprises combining equi-molecular portions of acetaldehyde and an aromatic amine in acid solution.

5. The process of making a deterioration retarder for rubber, which comprises combining equi-molecular portions of acetaldehyde and aniline in acid solution.

6. The process of making a deterioration retarder for rubber, which comprises combining equi-molecular portions of acetaldehyde and aniline in acid solution below 25° C.

7. The process of making a deterioration retarder for rubber, which comprises combining equi-molecular portions of acetaldehyde and aniline in hydrochloric acid solution.

8. The process of making a deterioration retarder for rubber, which comprises combining equi-molecular portions of acetaldehyde and aliline in hydrochloric acid solution below 20° C.

9. The process of making a deterioration retarder for rubber, which comprises dissolving a molecular equivalent of an aromatic amine in acid solution, adding a molecular equivalent of acetaldehyde in solution, precipitating and acetaldehyde aromatic amine condensation product by neutralizing the acid, and separating and washing the precipitate.

10. The process of making a deterioration retarder for rubber, which comprises dissolving a molecular equivalent of aniline in hydrochloric acid solution, adding a molecular equivalent of acetaldehyde in solution, precipitating an acetaldehyde-aniline condensation product by the addition of a base, and separating and washing the precipitate.

11. The process of making a deterioration retarder for rubber, which comprises dissolving a molecular equivalent of aniline in hydrochloric acid solution, adding a molecular equivalent of acetaldehyde in solution, while stirring, precipitating an acetaldehyde-aniline condensation product by the addition of an equi-molecular proportion of aniline, and separating and washing the precipitate.

12. The process of making a deterioration retarder for rubber, which comprises dissolving a molecular equivalent of aniline in hydrochloric acid solution and cooling, adding a molecular equivalent of acetaldehyde in solution while stirring and maintaining the temperature below 25° C., precipitating an acetaldehyde-aniline condensation product by the addition, with stirring of an equi-molecular proportion of aniline, and separating and washing the precipitate.

13. The process for continuously making a deterioration retarder for rubber which comprises dissolving aniline in a strong acid solution, reacting upon the aniline with an equi-molecular proportion of acetaldehyde, precipitating an acetaldehyde-aniline condensation product by the addition of an equi-molecular proportion of aniline, separating the precipitate, and again reacting upon the liquid remainder with an equi-molecular proportion of acetaldehyde.

14. The process for continuously making a deterioration retarder for rubber which comprises dissolving aniline in a strong acid solution, reacting upon the aniline with an equi-molecular proportion of acetaldehyde, precipitating an acetaldehyde-aniline condensation product by the addition of an equi-molecular proportion of aniline, separating the precipitate by filtration from the resulting acid solution of aniline, restoring the said solution to its original quantity and acidity, and again reacting upon the solution with an equi-molecular proportion of acetaldehyde.

15. The process of making a deterioration retarder for rubber, which comprises dissolving a molecular equivalent of aniline in a strong acid solution, adding a molecular equivalent of acetaldehyde in solution, precipitating an acetaldehyde-aniline condensation product by substantially neutralizing the acid with sodium hydroxide, and separating and washing the precipitate.

16. The process of making a deterioration retarder for rubber, which comprises dissolving a molecular equivalent of aniline in hydrochloric acid, adding a molecular equivalent of acetaldehyde in solution while maintaining the temperature below 25° C., neutralizing between .8 and .9 of the acid with sodium hydroxide, thereby precipitating an acetaldehyde-aniline condensation product, and separating and washing the precipitate.

17. As a retarder of deterioration of rubber, an acetaldehyde-aromatic amine condensation product prepared in a strongly acid solution.

18. As a retarder of deterioration of rubber, the acetaldehyde-aniline condensation product formed by the interaction of equi-molecular quantities of acetaldehyde and aniline in strongly acid solution.

19. As a retarder of deterioration of rubber, the acetaldehyde-aromatic amine condensation product formed by the interaction of equi-molecular quantities of acetaldehyde and an aromatic amine in acid solution.

20. As a retarder of deterioration of rubber, the finely divided solid product of the substantially complete reaction of equi-molecular quantities of acetaldehyde and aniline in strongly acid solution.

21. As a retarder of deterioration of rubber, the finely divided solid product of the substantially complete reaction of equi-molecular quantities of acetaldehyde and aniline in a strong acid solution.

22. As a retarder of deterioration of rubber, the solid product of the substantially complete reaction of equi-molecular quantities of acetaldehyde and aniline in a strong acid solution, having the form of a yellow powder, and a melting point between 50°–130° C.

Signed at New York, county and State of New York, this 19th day of September, 1924.

SIDNEY M. CADWELL.